United States Patent [19]

Mitsumori et al.

[11] Patent Number: 5,005,162
[45] Date of Patent: Apr. 2, 1991

[54] OPTICAL HEAD DEVICES FOR USE IN DISC PLAYERS

[75] Inventors: Koji Mitsumori; Hidehiro Kume, both of Tokyo, Japan

[73] Assignee: Sony Corporation, Tokyo, Japan

[21] Appl. No.: 338,184

[22] Filed: Apr. 14, 1989

[30] Foreign Application Priority Data

Apr. 25, 1988 [JP] Japan ............................ 63-101964

[51] Int. Cl.$^5$ ................................................ G11B 7/00
[52] U.S. Cl. .................................. 369/44.12; 369/112
[58] Field of Search ............... 369/44.11, 44.12, 111, 369/120, 121, 122, 112, 44.13, 44.14

[56] References Cited

U.S. PATENT DOCUMENTS 4,823,331  4/1989  Yoshitoshi et al. ............. 369/44.14
4,866,694  9/1989  Korth ............................. 369/44.11

Primary Examiner—Aristotelis M. Psitos
Assistant Examiner—Nabil Hindi
Attorney, Agent, or Firm—Lewis H. Eslinger

[57] ABSTRACT

An optical head device for use in a disc player comprises a movable optical assembly in which an objective lens, first and second mirrors, and a light beam generating and detecting unit are supported in common by a supporting member, and a driving mechanism for moving the movable optical assembly in both a first direction along an optical axis of the objective lens and a second direction perpendicular to the first direction, wherein, in the movable optical assembly, a light beam generated in the light beam generating and detecting unit is reflected twice by the first and second mirrors to be changed in its traveling direction, and focused by the objective lens at a position on the optical axis of the objective lens, and a light beam coming from the outside of the movable optical assembly is received by the objective lens to pass therethrough to the second mirror, reflected twice by the second and first mirrors to be changed in its traveling direction, and guided to a photodetector contained in the light beam generating and detecting unit.

13 Claims, 4 Drawing Sheets

OPTICAL HEAD DEVICES FOR USE IN DISC PLAYERS

BACKGROUND OF THE INVENTION

1. Field of the Invention

The present invention relates generally to optical head devices for use in disc players, and more particularly, to an optical head device which causes a light beam to impinge upon an optical record disc and guides the light beam from the optical record disc to a photodetector for reproducing information recorded on the optical record disc and is further operative to maintain the light beam incident upon the optical record disc in correct tracking and focus relations to a record track formed on the optical record disc.

2. Description of the Prior Art

In an optical disc player for reproducing information recorded on an optical record disc, an optical head device is provided for constituting an optical arrangement to read information from a record track formed on the optical record disc by the use of a laser light beam impinging upon the record track. The optical head device is required to produce the laser light beam, cause the laser light beam to impinge upon the record track, which is usually very narrow in width, so as to trace the same, and guide properly a reflected laser light beam obtained from the optical record disc to a photodetector. Further, the optical head device is also required to maintain the laser light beam incident upon the optical record disc in correct focus and tracking relations to the record track on the optical record disc.

For fulfilling these requirements, the optical head device comprises a precise arrangement of various optical components including a semiconductor laser for generating a laser light beam, an objective lens disposed for facing the optical record disc, other lenses, mirrors, prisms, photodetecting elements and so on, which is supported to be movable in both directions along an optical axis of the objective lens and perpendicular to the optical axis of the objective lens. This results in a disadvantage that the optical head device is apt to need troublesome adjusting work for each optical component and a relatively large space in which the various optical components are disposed and moved in the directions along the optical axis of the objective lens and perpendicular to the optical axis of the objective lens.

In view of this, as disclosed in the Japanese patent application published before examination under publication number 62-283430, there has been proposed an optical head device having an integrated light generating and receiving unit which comprises a semiconductor substrate on which a photodetector, a semiconductor laser, and a prism for directing a laser light beam generated by the semiconductor laser to the outside of the unit to be caused to impinge upon the optical record disc and for guiding a reflected laser light beam obtained from the optical record disc to the photodetector, as an optical head device intended to avoid the above mentioned disadvantage.

In such an optical head device provided with the integrated light beam generating and detecting unit as described above, the integrated light beam generating and detecting unit, a single mirror and an objective lens are supported by a common support member. The laser light beam which is generated by the semiconductor laser and directed by the prism to the outside of the unit is reflected by the mirror disposed on an optical axis of the objective lens to enter the objective lens and caused to impinge upon the optical record disc through the objective lens. Then, the reflected laser light beam from the optical record disc returns through the objective lens and is reflected by the mirror to enter the prism of the integrated light beam generating and detecting unit. In the integrated light beam generating and detecting unit, the reflected laser light beam is guided by the prism to the photodetector.

The support member supporting the integrated light beam generating and detecting unit, the single mirror and the objective lens in common is mounted on a driving mechanism and moved by the driving mechanism in both the direction along the optical axis of the objective lens and the direction perpendicular to the optical axis of the objective lens, so that the laser light beam incident to the optical record disc through the objective lens is subjected to a focus servo control by which the laser light beam incident upon the optical record disc is controlled to be maintained in correct focus relation to a record track formed on the optical record disc and subjected also to a tracking servo control by which the laser light beam incident upon the optical record disc is shifted in the direction perpendicular to the optical axis of the objective lens to be maintained in correct tracking relation to the record track formed on the optical record disc.

As described above, in the previously proposed optical head device having the integrated light beam generating and detecting unit, since an optical system for causing the laser light beam to impinge upon the optical record disc and receiving the reflected laser light beam from the optical record disc is constituted with the integrated light beam generating and detecting unit, the single mirror and the objective lens each supported in common by the support member, portions requiring troublesome adjustments are reduced and the device occupies a relatively small space.

However, in the optical head device having the integrated light beam generating and detecting unit, since an optical path formed between the integrated light beam generating and detecting unit and the objective lens is changed in direction once at the mirror, the integrated light beam generating and detecting unit has to be disposed to have its longitudinal direction along the optical axis of the objective lens and further, in the case where the optical path from the integrated light beam generating and detecting unit to the objective lens is made relatively long so that the numerical aperture of the objective lens is selected to be sufficiently large, the space between the mirror and the objective lens becomes relatively large. Consequently, the size of the device in the direction along the optical axis of the objective lens, that is, the thickness of the device, is not reduced enough so that the device can not be miniaturized in overall thickness. Further, although the optical path for the laser light beam can be adjusted be means of adjusting only the mirror, the degree of freedom in adjustment of the mirror is too large and therefore it is difficult to adjust precisely the optical path for the laser light beam.

OBJECTS AND SUMMARY OF THE INVENTION

Accordingly, it is an object of the present invention to provide an optical head device for use in a disc player, by which a light beam is caused to impinge upon an optical record disc and be maintained in correct focus and tracking relations to a record track formed on the optical record disc and the light beam from the optical record disc is guided to a photodetecting portion so that a detection output of information recorded on the optical record disc is obtained from the photodetecting portion, and which avoids the aforementioned disadvantages and problems encountered with the prior art.

Another object of the present invention is to provide an optical head device for use in a disc player, by which a light beam is caused to impinge upon an optical record disc and be maintained in correct focus and tracking relations to a record track formed on the optical record disc and the light beam from the optical record disc is guided to a photodetecting portion so that a detection output of information recorded on the optical record disc is obtained from the photodetecting portion, and which is miniaturized sufficiently so as to be reduced effectively in overall size, especially, in overall thickness.

A further object of the present invention is to provide an optical head device for use in a disc player, by which a light beam is caused to impinge upon an optical record disc and be maintained in correct focus and tracking relations to a record track formed on the optical record disc and the light beam from the optical record disc is guided to a photodetecting portion so that a detection output of information recorded on the optical record disc is obtained from the photodetecting portion, and which has an optical path arrangement miniaturized in overall thickness in which an optical path for the light beam can be adjusted easily and both a focus servo control for maintaining the light beam incident upon the optical record disc in correct focus relation to the record track and a tracking servocontrol for maintaining the light beam incident upon the optical record disc in correct tracking relation to the record track are carried out properly.

According to the present invention, there is provided an optical head device for use in a disc player comprising a movable optical assembly which has a finite-magnification objective lens, first and second light reflectors, and a light beam generating and detecting unit containing a semiconductor substrate provided with a photodetector and a light beam generator, each supported by a common supporting member, and a driving mechanism for moving the movable optical assembly in both a first direction along an optical axis of the finite-magnification objective lens and a second direction perpendicular to the first direction, wherein, in the movable optical assembly, a light beam generated by the light beam generator contained in the light beam generating and detecting unit is reflected by the first light reflector to be changed in its traveling direction, reflected further by the second reflector to be changed again in its traveling direction, and focused by the finite-magnification objective lens at a position on the optical axis of the finite-magnification objective lens, and a light beam coming from the outside of the movable optical assembly is received by the finite-magnification objective lens to pass therethrough to the second light reflector, reflected by the second light reflector to be changed in its traveling direction, reflected further by the first light reflector to be changed in its traveling direction, and guided to the photodetector contained in the light beam generating and detecting unit.

In the optical head device thus constituted in accordance with the present invention, since the light beam generated by the light beam generator contained in the light beam generating and detecting unit enters the finite-magnification objective lens through an optical path which is changed in direction twice at the first and second light reflectors and the light beam coming from the outside of the light beam generating and detecting unit is guided to the photodetector through an optical path which is changed in direction twice at the second and first light reflectors, the light beam generating and detecting unit is disposed to have its longitudinal direction perpendicular to the optical axis of the finite-magnification objective lens and further, even in the case where the optical path from the light beam generating and detecting unit to the finite-magnification objective lens is made relatively long so that the numerical aperture of the finite-magnification objective lens is selected to be sufficiently large, the space between the second light reflector and the finite-magnification objective lens becomes relatively small. Consequently, the movable optical assembly can be miniaturized in size in a direction along the optical axis of the the finite-magnification objective lens, so that the device can be miniaturized sufficiently to be reduced effectively in overall size, especially, in overall thickness, and the optical path for each of the light beam entering the finite-magnification objective lens and the light beam coming from the outside of the light beam generating and detecting unit can be adjusted easily by means of adjusting the first or second light reflector.

Further, the movable optical assembly miniaturized in size in the direction along the optical axis of the finite-magnification objective lens is moved by the driving mechanism in both the first and second directions and thereby each of the focus and tracking controls for the light beam focused by the finite-magnification objective lens is carried out properly.

The above, and other objects, features and advantages of the present invention will become apparent from the following detailed description which is to be read in conjunction with the accompanying drawings.

DESCRIPTION OF THE PREFERRED EMBODIMENTS

FIGS. 1 to 7 show one embodiment of an optical head device for use in a disc player according to the present invention.

Figure 1:
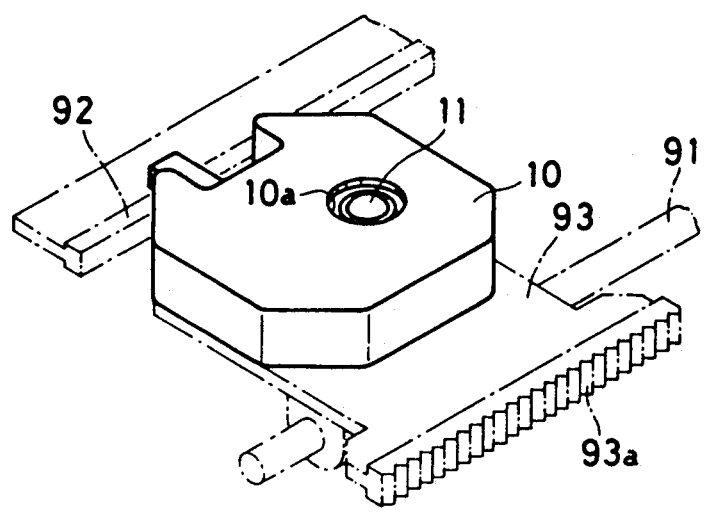
FIG. 1 is a schematic perspective view showing an embodiment of optical head device for use in a disc player according to the present invention.

Referring to FIG. 1, the embodiment has a case 10 provided with an opening 10a to which an objective lens 11 with finite magnification contained in the case 10 faces. On the occasion of actual use in a disc player, this embodiment is mounted on the upper surface of a movable base member 93 which is engaged to be movable with guide members 91 and 92 provided in the disc player. The movable base member 93 is driven by a driving mechanism, which is provided in the disc player with a pinion engaging with a rack portion 93a formed on the movable base member 93, to be moved in a direction along the radius of an optical record disc mounted on the disc player under the guidance by the guide members 91 and 92.

Figure 2:
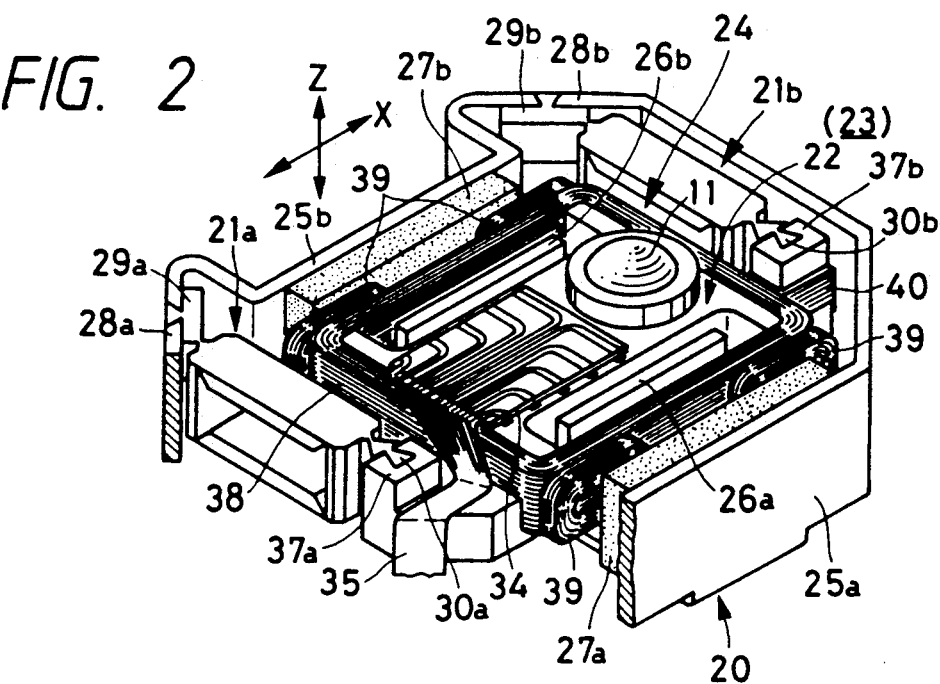
FIG. 2 is a perspective view showing a configuration in a case of the embodiment shown in FIG. 1.
Figure 3:
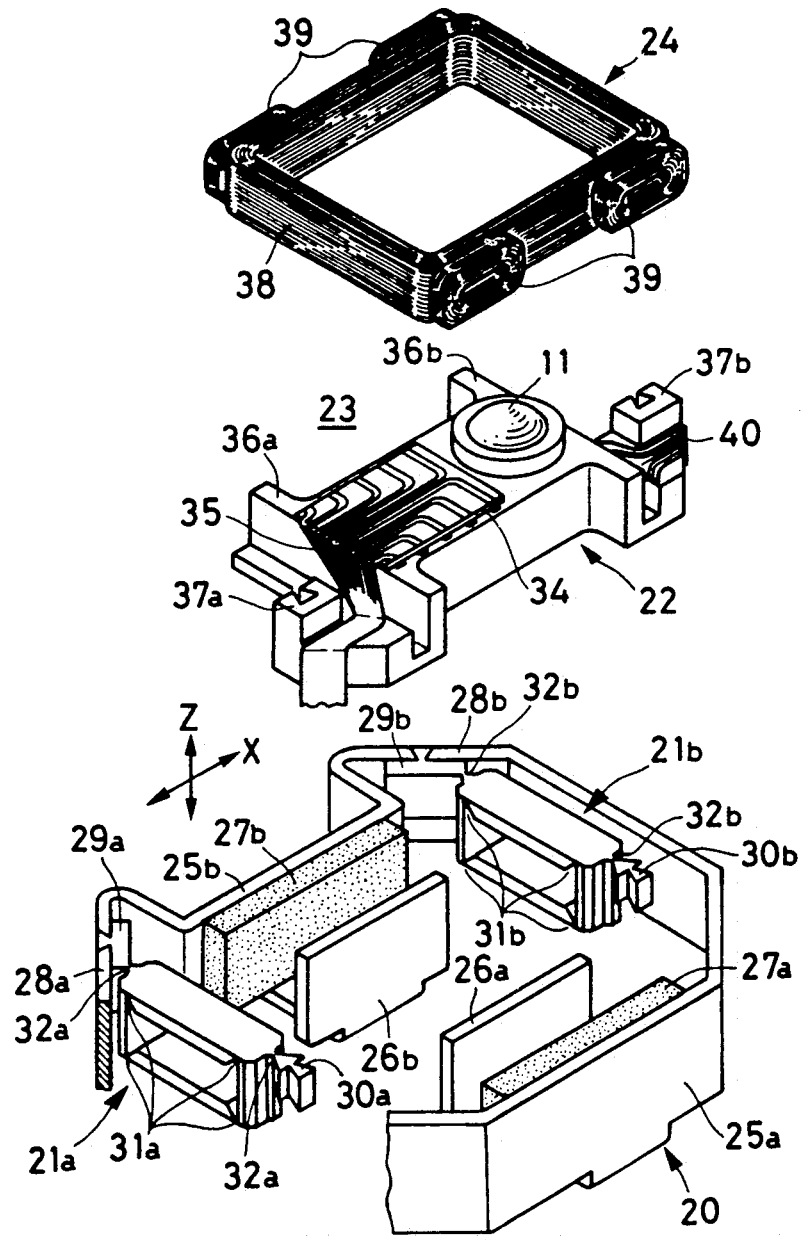
FIG. 3 is an exploded perspective view of the configuration shown in FIG. 2.

In the case 10 of the embodiment, as shown in FIG. 2 and 3, a magnetic yoke member 20 acting as a supporting frame member, a movable optical assembly 23 provided with a supporting member 22 connected through a pair of movable supporting members 21a and 21b to the magnetic yoke member 20 for supporting optical elements including the objective lens 11, and a driving coil assembly 24 mounted on the supporting member 22 for surrounding the same are contained. The magnetic yoke 20 is provided with a pair of opposite flat portions 25a and 25b, a standing projection 26a extending upward from the lower end of the flat portion 25a to face the same, and a standing projection 26b extending upward from the lower end of the flat portion 25b to face the same. Plate magnets 27a and 27b are attached respectively to the inner surfaces of the flat portions 25a and 25b facing the standing projections 26a and 26b respectively. The flat portion 25a, standing projection 26a and plate magnet 27a constitutes a first magnetic field forming portion, and the flat portion 25b, standing projection 26b and plate magnet 27b constitutes a second magnetic field forming portion.

Further, the magnetic yoke member 20 is provided with an engaging portion 28a to which a mounting end portion 29a of the movable supporting member 21a is fixed, so that the movable supporting member 21a is disposed at the inside of the magnetic yoke member 20 and provided also with an engaging portion 28b to which a mounting end portion 29b of the movable supporting member 21b is fixed, so that the movable supporting member 21b is disposed at the inside of the magnetic yoke member 20. The movable supporting member 21a provided with an engaging end portion 30a opposed to the mounting end portion 29a and a plurality of hinge portions 31a and 32a, as shown in FIG. 3, so that portions other than the mounting end portion 29a can be moved in both directions indicated with arrows X and Z in FIGS. 2 and 3 perpendicular to each other in relation to the mounting end portion 29a when the mounting end portion 29a is fixed to the engaging portion 28a of the magnetic yoke member 20. Similarly, the movable supporting member 21b provided with an engaging end portion 30b opposed to the mounting end portion 29b and a plurality of hinge portions 31b and 32b, as shown in FIG. 3, so that portions other than the mounting end portion 29b can be moved in both the X and Z directions in relation to the mounting end portion 29b when the mounting end portion 29b is fixed to the engaging portion 28b of the magnetic yoke member 20.

The supporting member 22 included in the movable optical assembly 23 is provided thereon with the objective lens 11 and an opening (not shown) which is adjacent to the objective lens 11 and covered by an integrated element mounting board 34 put on the supporting member 22. The integrated element mounting board 34 has a flexible connecting film 35 extending therefrom. The supporting member 22 contains various optical elements which are mounted on the inside of the supporting member 22 or disposed to be distant from the objective lens 11 in the supporting member 22, in addition to the objective lens 11.

Opposite end portions 36a and 36b of the supporting member 22 are provided with coupling portions 37a and 37b, respectively. The coupling portion 37a is engaged with the engaging end portion 30a of the movable supporting member 21a which is disposed at the inside of the magnetic yoke member 20 with the mounting end portion 29a thereof engaged with the engaging portion 28a of the magnetic yoke member 20 and the coupling portion 37b is engaged with the engaging end portion 30b of the movable supporting member 21b which is disposed at the inside of the magnetic yoke member 20 with the mounting end portion 29b thereof engaged with the engaging portion 28b of the magnetic yoke member 20, so that the supporting member 22 is disposed at the inside of the magnetic yoke member 20 in such a manner that a portion between the end portions 36a and 36b of the supporting member 22 is put between the standing projections 26a and 26b. This results in that the movable optical assembly 23 is mounted through the movable supporting members 21a and 21b on the magnetic yoke member 20 and the objective lens 11 is supported by the supporting member 22 to maintain an optical axis thereof in the Z direction.

The driving coil assembly 24 comprises a focus control coil 38 wound to be shaped into a rectangular framework and four tracking control coils 39, two pairs of which are attached to opposite side portions of the focus control coil 38, respectively, so as to have the respective axis for winding thereof substantially perpendicular to the axis for winding of the focus control coil 38, and disposed to surround the supporting member 22 at the inside of the magnetic yoke member 20. One of the side portions of the focus control coil 38 to which one of two pairs of coils 39 are attached is put between the standing projection 26a and the plate magnet 27a attached to the flat portion 25a of the magnetic yoke member 20 and the other of the side portions of the focus control coil 38 to which the other of two pair of tracking control coils 39 are attached is put between the standing projection 26b and the plate magnet 27b attached to the flat portion 25b of the magnetic yoke member 20, so that two pairs of tracking control coils 39 are facing the plate magnets 27a and 27b, respectively.

The focus control coil 38 and the tracking control coils 39 constitute, in cooperation with the first magnetic field forming portion constituted by the standing projection 26a and the plate magnet 27a attached to the flat portion 25a of the magnetic yoke member 20 and the second magnetic field forming portion constituted by the standing projection 26b and the plate magnet 27b attached to the flat portion 25b of the magnetic yoke member 20, driving mechanisms for focus servo control and tracking servocontrol. The focus control coil 38 and each of the tracking control coils 39 are supplied through the flexible connecting film 40 attached to the coupling portion 37b of the supporting member 22 with a focus control signal and a tracking control signal, respectively.

In the above mentioned arrangement wherein the movable supporting members 21a and 21b, the movable optical assembly 23, and the driving coil assembly are disposed at the inside of the magnetic yoke member 20, when the focus control signal is supplied to the focus control coil 38, the focus control coil 38 receives electromagnetic force varying in response to the polarity and level of the focus control signal in magnetic fields generated by the first and second magnetic field forming portions, respectively, so as to move in the Z direction, that is, in the direction along the optical axis of the objective lens 11. Accordingly, the supporting member 22 on which the focus control coil 38 is mounted is shifted in the Z direction with the bending operation at each of the hinge portions 31a of the movable supporting member 21a and the bending operation at each of the hinge portions 31b of the movable supporting member 21b, and as a result, the objective lens 11 held by the supporting member 22 is moved in the Z direction in response to the focus control signal.

Further, when the tracking control signal is supplied to each of the tracking control coils 39, each of the tracking control coils 39 receives electromagnetic force varying in response to the polarity and level of the tracking control signal in the magnetic fields generated by the first and second magnetic field forming portions, respectively, so as to move in the X direction, that is, in the direction perpendicular to the optical axis of the objective lens 11. Accordingly, the supporting member 22 on which the tracking control coils 39 are mounted through the focus control coil 38 is shifted in the X direction with the bending operation at each of the hinge portions 32a of the movable supporting member 21a and the bending operation at each of the hinge portions 32b of the movable supporting member 21b, and as a result, the objective lens 11 held by the supporting member 22 is moved in the X direction in response to the tracking control signal.

Figure 4:
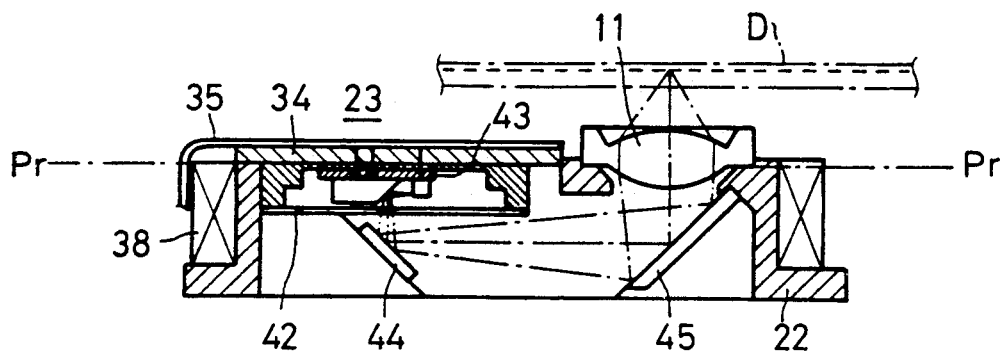
FIG. 4 is a cross-sectional view showing one example of a movable optical assembly used in the embodiment shown in FIG. 1.

In the supporting member 22, as shown in FIG. 4, for example, a package 42 which contains a light beam generating and detecting unit 43 is mounted on the inner surface of the integrated element mounting board 34. Further, a mirror 44 is held by the supporting member 22 to be disposed under the light beam generating and detecting unit 43, and another mirror 45 is also held by the supporting member 22 under the objective lens 11 to be disposed on the axis of the objective lens 11. Both of the mirrors 44 and 45 or the mirror 44 may be formed with a light reflective coating provided on a semiconductor substrate of silicon or with a prism mirror provided on a semiconductor substrate of silicon.

In such an arrangement, a reference plane for mounting of the light beam generating and detecting unit 43 on the supporting member 22 and a reference plane for mounting of the objective lens 11 on the supporting member 22 reside on a common plane Pr, as shown in FIG. 4, and therefore the optical axis of the objective lens 11 is substantially perpendicular to the reference plane for mounting of the light beam generating and detecting unit 43 on the supporting member 22.

The light beam generating and detecting unit 43 contained in the package 42 is operative to generate a laser light beam directed toward the mirror 44 which is disposed under the light beam generating and detecting unit 43. The laser light beam from the light beam generating and detecting unit 43 is reflected by the mirror 44 and then reflected further by the mirror 45 to be directed upward to enter the objective lens 11. The objective lens 11 is operative to focus the laser light beam from the mirror 45 on an optical record disc D. Then, a reflected laser light beam obtained from the optical record disc D returns through the objective lens 11 to the mirror 45 to be reflected thereby. The reflected laser light beam reflected by the mirror 45 is further reflected by the mirror 44 to be directed upward to the light beam generating and detecting unit 43 contained in the package 42. Accordingly, in the supporting member 22, each of the laser light beam and the reflected laser light beam travels along an optical path which is changed in its direction twice by the mirrors 44 and 45 between the light beam generating and detecting unit 43 and the objective lens 11 so as to have parallel portions between the light beam generating and detecting unit 43 and the mirror 44 and between the mirror 45 and the objective lens 11.

Figure 5:
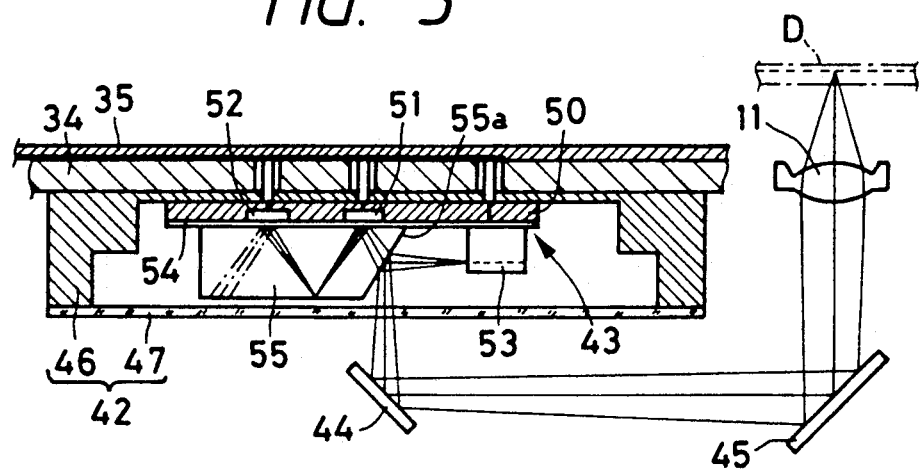
FIG. 5 is an enlarged cross-sectional view showing a light beam generating and detecting unit and a package containing the light beam generating and detecting unit, together with other optical elements, employed in the movable optical assembly shown in FIG. 4.

As shown in FIG. 5 in which the light beam generating and detecting unit 43 contained in the package 42 is enlarged, the package 42 mounted on the inner surface of the integrated element mounting board 34 comprises a body 46 in which the light beam generating and detecting unit 43 is disposed and a glass plate member 47 attached to the body 46. The laser light beam generated by the light beam generating and detecting unit 43 passes through the glass plate member 47 to the mirror 44 and the reflected laser light beam reflected by the mirror 44 passes through the glass plate member 47 to the light beam generating and detecting unit 43.

In the light beam generating and detecting unit 43, as shown in FIG. 5, first and second photodetectors 51 and 52 are formed to align in a semiconductor substrate 50. A semiconductor laser 53 is also provided on the surface of the semiconductor substrate 50. Further, a protective coating layer 54 is formed to cover the surface of the semiconductor substrate 50 except for a portion thereof on which the semiconductor laser 53 is placed and where a prism 55 is fixed on a portion of the protective coating layer 54 covering an area of the semiconductor substrate 50 wherein the first and second photodetectors 51 and 52 are formed. With such optical elements, the light beam generating and detecting unit 43 is integrated.

The prism 55 has a semi-transparent surface 55a which faces the semiconductor laser 53 and is inclined in relation to the surface of the semiconductor substrate on which the semiconductor laser 53 is placed.

In the light beam generating and detecting unit 43 thus constituted, the laser light beam generated by the semiconductor laser 53 is reflected by the semi-transparent surface 55a of the prism 55 to pass through the glass plate member 47 toward the mirror 44. Then, the laser light beam from the semi-transparent surface 55a of the prism 55 is reflected twice by the mirrors 44 and 45 and caused to impinge upon the optical record disc D through the objective lens 11. On the other hand, the reflected laser light beam obtained from the optical record disc D returns through the objective lens 11 and is reflected twice by the mirrors 45 and 44. Then, the reflected laser light beam from the mirror 44 passes through the semi-transparent surface 55a of the prism 55 to enter the prism 55.

In the prism 55, a part of the reflected laser light beam reaches to the first photodetector 51 and the rest of the reflected laser light beam is reflected to reach to the second photodetector 52. The reflected laser light beam is arranged to have a focusing point on an optical path formed between the first and second photodetectors 51 and 52 in the prism 55.

Figure 6:
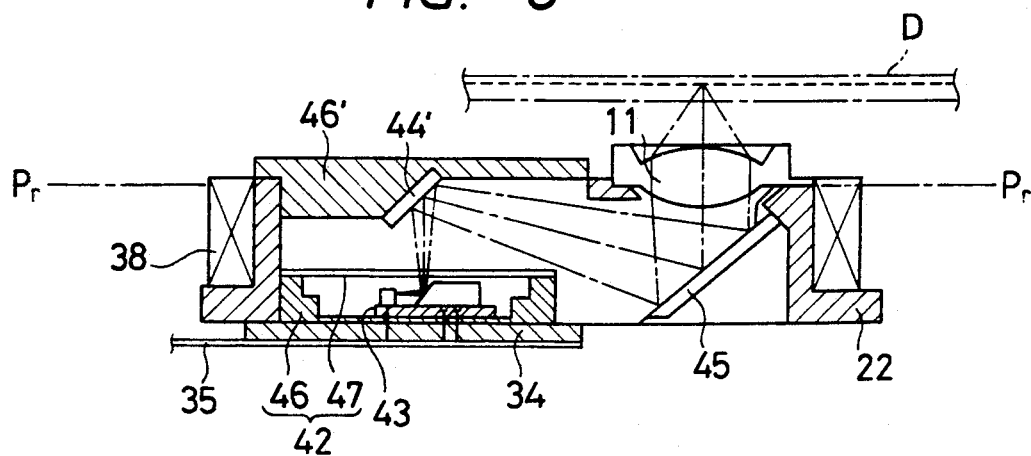
FIG. 6 is a cross-sectional view showing another example of a movable optical assembly used in the embodiment shown in FIG. 1.

FIG. 6 shows another example of the optical arrangement in the supporting member 22. In FIG. 6, elements and parts corresponding to those of FIG. 4 are marked with the same references.

In the example shown in FIG. 6, the integrated element mounting board 34 on which the package 42 containing the light beam generating and detecting unit 43 is mounted is attached to a lower portion of the supporting member 22 in such a manner that the glass plate member 47 of the package 42 is placed upward and the opening formed on the supporting member 22 to be adjacent to the objective lens 11 is covered by a ceiling member 46'. A mirror 44' is fixed to the inner portion of the ceiling member 46' to be positioned above the light beam generating and detecting unit 43 and to face the mirror 45.

The laser light beam generated by the light beam generating and detecting unit 43 is directed upward to pass through the glass plate member 47 of the package 42 toward the mirror 44'. This laser light beam from the light beam generating and detecting unit 43 is reflected by the mirror 44' and then reflected further by the mirror 45 to be directed upward to enter the objective lens 11. The objective lens 11 is operative to focus the laser light beam from the mirror 45 on an optical record disc D. Then, a reflected laser light beam obtained from the optical record disc D returns through the objective lens 11 to the mirror 45 to be reflected thereby. The reflected laser light beam reflected by the mirror 45 is further reflected by the mirror 44' to be directed downward to pass through the glass plate member 47 of the package 42 and to reach the light beam generating and detecting unit 43 contained in the package 42. Accordingly, in the example shown in FIG. 6, each of the laser light beam and the reflected laser light beam travels along an optical path which is changed in its direction twice by the mirrors 44' and 45 between the light beam generating and detecting unit 43 and the objective lens 11 so as to have parallel portions between the light beam generating and detecting unit 43 and the mirror 44' and between the mirror 45 and the objective lens 11.

In each of the examples shown in FIG. 4 and FIG. 6, detection outputs each varying in response to variations in the reflected laser light beam are obtained from the first and second photodetectors 51 and 52 provided in the light beam generating and detecting unit 43, respectively, and derived through the flexible connecting film 35 from the light beam generating and detecting unit 43. Then, a reproduced information signal, a focus error signal and a tracking error signal are produced based on the detection outputs obtained from the first and second photodetectors 51 and 52.

Figure 7:
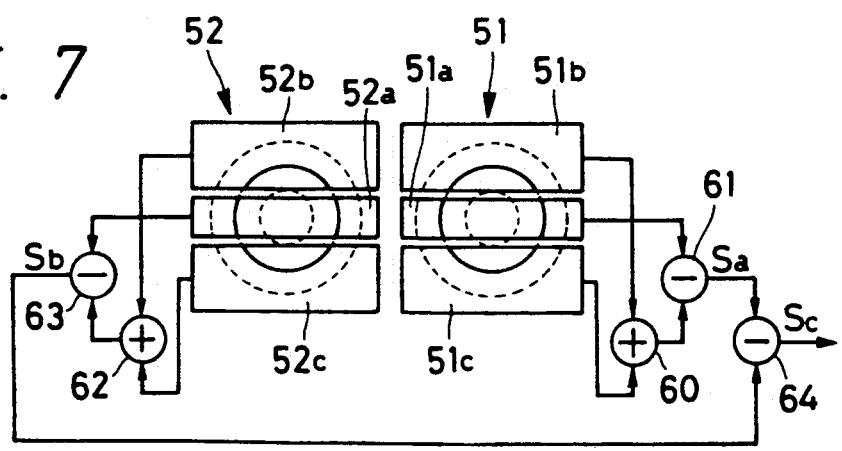
FIG. 7 is an illustration used for explaining production of a focus error signal based on detection outputs obtained from the a light beam generating and detecting unit shown in FIG. 5.

FIG. 7 shows an example of an arrangement for producing the focus error signal. In this example, the first photodetector 51 is composed of a central photodetecting element 51a and side photodetecting elements 51b and 51c facing each other with the central photodetecting element 51a between them in a common plane, and similarly the second photodetector 52 is composed of a central photodetecting element 52a and side photodetecting elements 52b and 52c facing each other with the central photodetecting element 52a between them in a common plane.

Three detection outputs are obtained from the central photodetecting element 51a and the side photodetecting elements 51b and 51c, respectively, in response to a beam spot formed on the first photodetector 51 by the reflected laser light beam and another three detection outputs are obtained from the central photodetecting element 52a and the side photodetecting elements 52b and 52c, respectively, in response to a beam spot formed on the second photodetector 52 by the reflected laser light beam. The detection outputs from the side photodetecting elements 51b and 51c are supplied to an adder 60, and an added output obtained from the adder 60 and the output from the central photodetecting element 51a are supplied to a subtracter 61 to produce a difference output Sa. The detection outputs from the side photodetecting elements 52b and 52c are supplied to an adder 62, and an added output obtained from the adder 62 and the output from the central photodetecting element 52a are supplied to a subtracter 63 to produce a difference output Sb. Then, the difference outputs Sa and Sb are supplied to a subtracter 64 to produce a difference output Sc.

The reflected laser light beam which forms the beam spot on each of the first and second photodetectors 51 and 52 has the focusing point thereof in the middle of the optical path formed between the first and second photodetectors 51 and 52 in the prism 55 when the laser light beam incident upon the optical record disc D is in a proper focus condition, at a position on the optical path formed between the first and second photodetectors 51 and 52 in the prism 55 on the side of the first photodetector 51 when the laser light beam incident upon the optical record disc D is in an over-focus condition, and at a position on the optical path formed between the first and second photodetectors 51 and 52 in the prism 55 on the side of the second photodetector 52 when the laser light beam incident upon the optical record disc D is in an under-focus condition.

Therefore, the beam spot on the first photodetector 51 is substantially equal in size to the beam spot on the second photodetector 52 when the laser light beam incident upon the optical record disc D is in the proper focus condition, the beam spot which is formed on the first photodetector 51 when the laser light beam incident upon the optical record disc D is in the over-focus condition is reduced in size compared with the beam spot which is formed on the first photodetector 51 when the laser light beam incident upon the optical record disc D is in the proper focus condition and the beam spot which is formed on the second photodetector 52 when the laser light beam incident upon the optical record disc D is in the over-focus condition is enlarged compared with the beam spot which is formed on the second photodetector 52 when the laser light beam incident upon the optical record disc D is in the proper focus condition, and the beam spot which is formed on the first photodetector 51 when the laser light beam incident upon the optical record disc D is in the under-focus condition is enlarged compared with the beam spot which is formed on the first photodetector 51 when the laser light beam incident upon the optical record disc D is in the proper focus condition and the beam spot which is formed on the second photodetector 52 when the laser light beam incident upon the optical record disc D is in the under-focus condition is reduced in size compared with the beam spot which is formed on the second photodetector 52 when the laser light beam incident upon the optical record disc D is in the proper focus condition.

Consequently, each of the difference outputs Sa and Sb described above varies in level in response to variations in the focus condition of the laser light beam incident upon the optical record disc D, and thereby the difference output Sc has the level of zero when the laser light beam incident upon the optical record disc D is in the proper focus condition, a positive or negative level when the laser light beam incident upon the optical record disc D is in the over-focus condition, and a negative or positive level when the laser light beam incident upon the optical record disc D is in the under-focus condition, so as to be used as the focus error signal.

As described above, in the embodiment shown in FIGS. 1 to 7, the light beam generating and detecting unit 43 which comprises the semiconductor substrate 50 in which the first and second photodetectors 51 and 52 are formed and the semiconductor laser 53 provided on the semiconductor substrate 50 to be integrated is provided in such a manner that the optical axis of the objective lens 11 is substantially perpendicular to the reference plane for mounting of the light beam generating and detecting unit 43 to the supporting member 22, and each of the laser light beam generated by the light beam generating and detecting unit 43 and the reflected laser light beam obtained from the optical record disc D travels along the optical path which is changed in direction twice by the mirrors 44 and 45 or 44' and 45 between the light beam generating and detecting unit 43 and the objective lens 11. This means that the light beam generating and detecting unit 43 is disposed to have its longitudinal direction perpendicular to the optical axis of the objective lens 11 and further the optical path from the light beam generating and detecting unit 43 to the objective lens 11 is made sufficiently long with the relatively small space between the mirror 45 and the objective lens 11. Consequently, the movable optical assembly 23 including the supporting member 22 can be miniaturized in size in the direction along the optical axis of the the objective lens 11, so that the embodiment can be miniaturized sufficiently to be reduced effectively in overall thickness. Further, the optical path between the light beam generating and detecting unit 43 and the objective lens 11 can be adjusted easily by means of, for example, adjusting the position of the package 42 containing the light beam generating and detecting unit 43.

Figure 8:
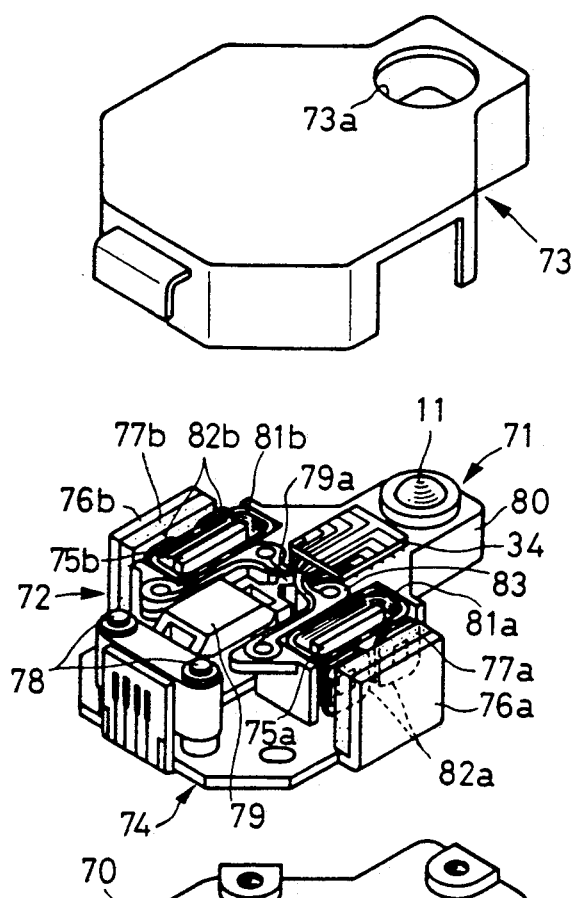
FIG. 8 is an exploded perspective view showing another embodiment of an optical head device for use in a disc player according to the present invention.

FIG. 8 shows another embodiment of optical head device for use in a disc player according to the present invention.

Referring to FIG. 8, this embodiment comprises a base plate member 70, a movable optical assembly 71 mounted on the base plate member 70, a biaxial driving mechanism 72 which is also mounted on the base plate member 70 and operative to perform driving operations for focus and tracking servocontrols, and a case 73 provided for covering the movable optical assembly 71 and the biaxial driving mechanism 72 on the base plate member 70. The case 73 has an opening 73a to which an objective lens 11 with finite magnification included in the movable optical assembly 71 faces.

The biaxial driving mechanism 72 has a magnetic yoke member 74 acting as a supporting plate member. The magnetic yoke member 74 is provided with a pair of standing projections 75a and 75b and another pair of standing projections 76a and 76b facing the standing projections 75a and 75b respectively, and plate magnets 77a and 77b are attached to the standing projections 76a and 76b respectively. The standing projections 75a and 76a and the plate magnet 77a constitutes a first magnetic field forming portion, and the standing projections 75b and 76b and the plate magnet 77b constitutes a second magnetic field forming portion.

On the magnetic yoke member 74, a movable support member 79 is mounted by a couple of pins 78 projecting upward from the magnetic yoke member 74. The movable support member 79 is provided with a hinge portion 79a and a plurality of other hinge portions which are operative to shift the hinge portion 79a in the direction along each of the pins 78. Further, the movable supporting member 79 is connected through the hinge portion 79a with a supporting member 80.

The supporting member 80 is provided thereon with the objective lens 11 and contains therein various optical elements in addition to the objective lens 11 so as to constitute the movable optical assembly 71. The supporting member 80 is further provided with an opening which is adjacent to the objective lens 11 and covered by an integrated element mounting board 34 put on the supporting member 80. In this embodiment, the objective lens 11 and the integrated element mounting board 34 are aligned along a line passing through the middle point between the pins 78 and the position of the hinge portion 79a.

In the supporting member 80, a package which contains a light beam generating and detecting unit is mounted on the inner surface of the integrated element mounting board 34, in the same manner as the supporting member 22 employed in the embodiment shown in FIGS. 1 to 7. Further, a first mirror is held by the supporting member 80 to be disposed under the light beam generating and detecting unit, and a second mirror is also held by the supporting member 80 under the objective lens 11 to be disposed on the axis of the objective lens 11. These objective lens 11, light beam generating and detecting unit, and first and second mirrors are arranged to function in the same manner as those employed in the movable optical assembly 23 in the embodiment shown in FIGS. 1 to 7.

The supporting member 80 is provided, in addition to the optical arrangement mentioned above, with a pair of focus control coils 81a and 81b each wound to be shaped into a tube and disposed to surround the standing projections 75a and 75b respectively. Two tracking control coils 82a are attached through an insulator to the surface of the focus control coil 81a facing the plate magnet 77a and another two tracking control coils 82b are attached through an insulator to the surface of the focus control coil 81b facing the plate magnet 77b. Further, on the upper surface of the supporting member 80, one end portion of a flexible connecting film 83 is attached for supplying the focus control coils 81a and 81b with a focus control signal and supplying also the tracking control coils 82a and 82b with a tracking control signal.

In the above mentioned arrangement, when the focus control signal is supplied through the flexible connecting film 83 to each of the focus control coils 81a and 81b, the focus control coils 81a and 81b receive electromagnetic force varying in response to the polarity and level of the focus control signal in magnetic fields generated by the first and second magnetic field forming portions, respectively, so as to move in the direction along the optical axis of the objective lens 11. Accordingly, the supporting member 80 on which the focus control coils 81a and 81b are mounted is shifted in the direction along the optical axis of the objective lens 11 with the bending operation at each of the hinge portions of the movable support member 79, and as a result, the objective lens 11 held by the supporting member 80 is moved in the direction along the optical axis thereof in response to the focus control signal.

Further, when the tracking control signal is supplied through the flexible connecting film 83 to each of the tracking control coils 82a and 82b, the tracking control coils 82a and 82b receive electromagnetic force varying in response to the polarity and level of the tracking control signal in the magnetic fields generated by the first and second magnetic field forming portions, respectively, so that the tracking control coils 82a are moved to approach the plate magnet 77a or to recede from the plate magnet 77a and the tracking control coils 82b are moved to recede from the plate magnet 77b or to approach the plate magnet 77b. Accordingly, the supporting member 80 on which the tracking control coils 82a and 82b are mounted through the focus control coils 81a and 81b, respectively, is shifted to rotate on an axis formed at the hinge portion 79a of the movable support member 79, and as a result, the objective lens 11 held by the supporting member 80 is moved in the direction substantially perpendicular to the optical axis thereof in response to the tracking control signal.

Figure 9:
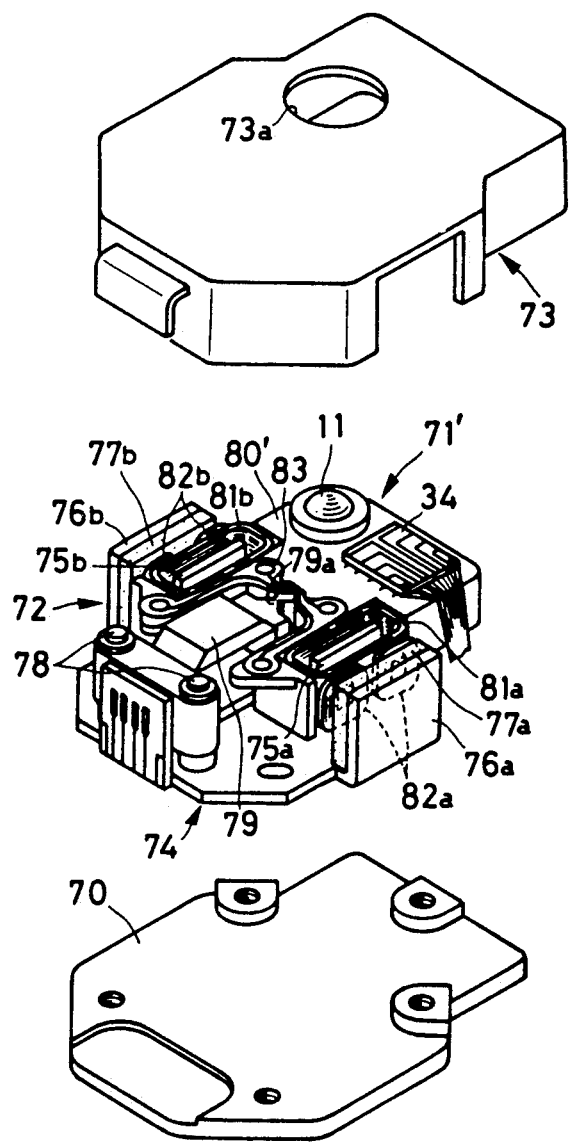
FIG. 9 is an exploded perspective view showing a further embodiment of an optical head device for use in a disc player according to the present invention.

FIG. 9 shows a further embodiment of optical head device for use in a disc player according to the present invention. This embodiment is obtained by means of substituting a supporting member 80' constituting a movable optical assembly 71' for the supporting member 80 constituting the movable optical assembly 71 in the embodiment shown in FIG. 8. In FIG. 9, elements and parts corresponding to those of the FIG. 8 embodiment are marked with the same references and further description thereof will be omitted.

In the embodiment shown in FIG. 9, the supporting member 80' is provided thereon with the objective lens 11 and contains therein various optical elements in addition to the objective lens 11 so as to constitute the movable optical assembly 71'. The supporting member 80' is further provided with an opening which is adjacent to the objective lens 11 and covered by an integrated element mounting board 34 put on the supporting member 80'. In this embodiment, the objective lens 11 and the integrated element mounting board 34 are aligned in a direction substantially perpendicular to a line passing through the middle point between pins 78 and the position of a hinge portion 79a.

Other portions of the embodiment shown in FIG. 9 are constituted in the same manner as those of the embodiment shown in FIG. 8, and advantages and merits which are the same as those of the embodiment shown in FIG. 8 are also obtained from the embodiment shown in FIG. 9.

What is claimed is:

1. An optical head device in a disc player comprising:
  a movable optical assembly which has a finite magnification objective lens, a first mirror and a second mirror, and a light beam generating and detecting unit having a semiconductor substrate including photodetecting means and light beam generating means formed thereon, said finite-magnification objective lens, said first and second mirrors, and said light beam generating and detecting unit being supported in said movable optical assembly by a common supporting member, and
  a driving mechanism for moving said movable optical assembly in both a first direction along an optical axis of said finite-magnification objective lens and a second direction substantially perpendicular to said first direction;
  wherein, in said movable optical assembly, a light beam generated by said light beam generating means is reflected by said first mirror and changed in direction, reflected further by said second mirror and changed again in direction, and focused by said finite-magnification objective lens at a point on the optical axis of said finite-magnification objective lens, and wherein a light beam coming from outside of said movable optical assembly is received by said finite-magnification objective lens to pass therethrough to said second mirror, is reflected by said second mirror and changed in direction, and guided to said photodetecting means in said light beam generating and detecting unit.

2. An optical head device according to claim 1, wherein said second mirror is disposed on the optical axis of said finite-magnification objective lens between said finite-magnification objective lens and said first mirror.

3. An optical head device according to claim 2, wherein said first mirror is so disposed as to form an optical path for the light beam which extends between said light beam generating and detecting unit and said first mirror that is substantially parallel with an optical path for the light beam formed between said second mirror and said finite-magnification objective lens.

4. An optical head device according to claim 3, wherein said light beam generating and detecting unit is fixed to said common supporting member so to be adjacent said finite-magnification objective lens and substantially coplanar therewith, and said first mirror is disposed between said light beam generating and detecting unit and said second mirror.

5. An optical head device according to claim 3, wherein said light beam generating and detecting unit is fixed to said common supporting member and said first mirror is disposed in opposing relationship to said light beam generating detecting unit and substantially coplanar with said finite-magnification objective lens.

6. An optical head device according to claim 1, wherein said light beam generating and detecting unit is so disposed that the optical axis of said finite-magnification objective lens is substantially perpendicular to a reference plane for mounting of said light beam generating and detecting unit to said common supporting member.

7. An optical head device according to claim 1, wherein at least said first mirror is formed with a light reflective coating provided on a semiconductor substrate of silicon.

8. An optical head device according to claim 1, wherein said light beam generating and detecting unit is contained in a package fixed to said common supporting member.

9. An optical head device in a disc player comprising:
  a movable optical assembly having a supporting member by which a finite-magnification objective lens, a first mirror and a second mirror, and a light beam generating and detecting unit having a semiconductor substrate and including photodetecting means and light beam generating means supported in common on said substrate, a movable support member coupled with said supporting member, and driving coil means coupled with said supporting member for moving said supporting member in both a first direction along an optical axis of said finite-magnification objective lens and a second direction substantially perpendicular to said first direction; and magnetic field generating means operative to produce a magnetic field acting on said driving coil means, said magnetic field generating means in cooperation with said driving coil means forming a driving mechanism;

wherein, in said movable optical assembly, a light beam generated by said light beam generating means is reflected by said first mirror and changed in direction, reflected further by said second mirror and changed again in direction, and focused by said finite-magnification objective lens at a position on the optical axis of said finite-magnification objective lens, and wherein a light beam coming from outside of said movable optical assembly is received by said finite-magnification objective lens to pass therethrough to said second mirror, reflected by said second mirror and changed in direction, reflected further by said first mirror and changed in direction, and guided to said photodetecting means in said light beam generating and detecting unit.

10. An optical head device according to claim 9, wherein said second mirror is disposed on the optical axis of said finite-magnification objective lens between said finite-magnification objective lens and said mirror.

11. An optical head device according to claim 10, wherein said first mirror is so disposed as to form an optical path for the light beam which extends between said light beam generating and detecting unit and said first mirror that is substantially parallel with an optical path for the light beam formed between said second mirror and said finite-magnification objective lens.

12. An optical head device according to claim 11, wherein said light beam generating and detecting unit is fixed to said supporting member so to be adjacent to said finite-magnification objective lens and substantially coplanar therewith, and said first mirror is disposed between said light beam generating and detecting until and said second mirror.

13. An optical head device according to claim 11, wherein said light beam generating and detecting unit is fixed to said supporting member and said first mirror is disposed in opposing relationship to said light beam generating and detecting unit and said second mirror is substantially coplanar with said finite-magnification lens.

* * * * *

UNITED STATES PATENT AND TRADEMARK OFFICE
CERTIFICATE OF CORRECTION

PATENT NO. : 5,005,162
DATED : April 2, 1991
INVENTOR(S) : Koji Mitsumori; Hidehiro Kume It is certified that error appears in the above-identified patent and that said Letters Patent is hereby corrected as shown below:

In the Claims:

Col. 13, line 65, after "finite" insert -- - --

Signed and Sealed this

Fifteenth Day of December, 1992

Attest:

DOUGLAS B. COMER

Attesting Officer     Acting Commissioner of Patents and Trademarks